(12) United States Patent
Saito et al.

(10) Patent No.: US 12,320,331 B2
(45) Date of Patent: Jun. 3, 2025

(54) CONDITION MONITORING SYSTEM

(71) Applicant: NTN CORPORATION, Osaka (JP)

(72) Inventors: Hitoshi Saito, Kuwana (JP); Takashi Haseba, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 18/585,536

(22) Filed: Feb. 23, 2024

(65) Prior Publication Data

US 2024/0229773 A1 Jul. 11, 2024

Related U.S. Application Data

(63) Continuation of application No. 17/599,518, filed as application No. PCT/JP2020/009556 on Mar. 6, 2020, now Pat. No. 11,939,955.

(30) Foreign Application Priority Data

Mar. 28, 2019 (JP) .................. 2019-062680
Feb. 14, 2020 (JP) .................. 2020-023495

(51) Int. Cl.
*F03D 17/00* (2016.01)
*F03D 7/02* (2006.01)
*F03D 80/70* (2016.01)

(52) U.S. Cl.
CPC .......... *F03D 17/00* (2016.05); *F03D 7/0264* (2013.01); *F03D 80/70* (2016.05);
(Continued)

(58) Field of Classification Search
CPC ........ F03D 7/0264; F03D 15/00; F03D 15/10; F03D 17/00; F03D 80/70; F05B 2240/50;
(Continued)

(56) References Cited

U.S. PATENT DOCUMENTS 4,872,337 A 10/1989 Watts et al.
2003/0066352 A1 4/2003 Leamy et al.
(Continued)

FOREIGN PATENT DOCUMENTS

CN 102175269 A * 9/2011
CN 104065168 A 9/2014
(Continued)

OTHER PUBLICATIONS

Extended European Search Report issued in corresponding European Patent Application No. 20776413.5, dated Nov. 14, 2022.
(Continued)

*Primary Examiner* — John M Zaleskas
(74) *Attorney, Agent, or Firm* — Rimon P.C.

(57) ABSTRACT

A condition monitoring system includes a monitoring terminal, an acceleration sensor, and a data processor. The data processor calculates a diagnostic parameter from data measured by the acceleration sensor, determines a degree of damage to a bearing or a gear included in a wind turbine generator based on the diagnostic parameter, and controls the monitoring terminal to show information indicating a degree of suppression of electric power generated by the wind turbine generator in accordance with the degree of damage to the bearing or the gear.

5 Claims, 15 Drawing Sheets

(52) U.S. Cl.
CPC ... *F05B 2240/50* (2013.01); *F05B 2260/4031* (2013.01); *F05B 2260/80* (2013.01); *F05B 2270/327* (2013.01); *F05B 2270/807* (2013.01); *Y02E 10/72* (2013.01)

(58) Field of Classification Search
CPC .......... F05B 2260/4031; F05B 2260/80; F05B 2270/327; F05B 2270/807; Y02E 10/72
See application file for complete search history.

(56) References Cited

U.S. PATENT DOCUMENTS

| | | | |
|---|---|---|---|
| 2009/0295160 A1 | 12/2009 | Wittekind et al. | |
| 2010/0161263 A1 | 6/2010 | Benmouyal et al. | |
| 2010/0198534 A1 | 8/2010 | Hala et al. | |
| 2012/0029838 A1 | 2/2012 | Hallman et al. | |
| 2012/0073364 A1 | 3/2012 | Hatch et al. | |
| 2012/0156034 A1 | 6/2012 | Sabannavar et al. | |
| 2013/0006540 A1 | 1/2013 | Sakaguchi et al. | |
| 2013/0096848 A1 | 4/2013 | Hatch et al. | |
| 2014/0304201 A1 | 10/2014 | Hyldgaard et al. | |
| 2015/0052985 A1* | 2/2015 | Brenner | G01P 15/00 73/112.01 |
| 2015/0116131 A1 | 4/2015 | Ikeda et al. | |
| 2015/0369698 A1 | 12/2015 | Sakaguchi et al. | |
| 2016/0245263 A1 | 8/2016 | Ikeda et al. | |
| 2017/0016429 A1 | 1/2017 | Koyamachi et al. | |
| 2017/0096986 A1 | 4/2017 | Takeuchi et al. | |
| 2017/0130700 A1 | 5/2017 | Sakaguchi et al. | |
| 2017/0363072 A1* | 12/2017 | Son | G01M 7/00 |
| 2018/0217025 A1 | 8/2018 | Haseba | |
| 2018/0291878 A1 | 10/2018 | Mtauweg | |
| 2018/0347548 A1 | 12/2018 | Potter et al. | |
| 2019/0033169 A1 | 1/2019 | Kamiya et al. | |
| 2019/0101103 A1 | 4/2019 | Haseba et al. | |
| 2019/0101104 A1 | 4/2019 | Suzuki et al. | |
| 2019/0128243 A1 | 5/2019 | Hasan et al. | |
| 2019/0154007 A1 | 5/2019 | Ramakrishnan et al. | |
| 2019/0211805 A1 | 7/2019 | Elmose et al. | |
| 2020/0025648 A1 | 1/2020 | Haseba | |
| 2020/0097686 A1 | 3/2020 | Thygesen | |
| 2020/0158562 A1 | 5/2020 | Hatakeyama et al. | |
| 2020/0333214 A1 | 10/2020 | Katou et al. | |
| 2021/0033074 A1 | 2/2021 | Kaur et al. | |
| 2022/0170446 A1* | 6/2022 | Saito | F03D 7/0264 |

FOREIGN PATENT DOCUMENTS

| | | |
|---|---|---|
| CN | 106870297 A | 6/2017 |
| CN | 109446023 A | 3/2019 |
| EP | 2213998 A2 | 8/2010 |
| EP | 3163074 A1 | 5/2017 |
| JP | 3882328 B2 | 2/2007 |
| JP | 2009-287564 A | 12/2009 |
| JP | 2013-185507 A | 9/2013 |
| JP | 2017-167027 A | 9/2017 |
| JP | 2017-173321 A | 9/2017 |
| JP | 2017-525891 A | 9/2017 |
| JP | 2018060387 A * | 4/2018 |
| JP | 2018-179752 A | 11/2018 |
| JP | 2019-27860 A | 2/2019 |
| WO | 2013-080321 A1 | 6/2013 |
| WO | 2016/026961 A1 | 2/2016 |
| WO | 2017/190745 A1 | 11/2017 |
| WO | 2018/142986 A1 | 8/2018 |

OTHER PUBLICATIONS

International Search Report issued in corresponding International Patent Application No. PCT/JP2020/009556, dated May 26, 2020, with English translation.

Notice of Allowance issued in the corresponding U.S. Appl. No. 17/599,518 dated Nov. 24, 2023.

Non-Final Office Action issued in the corresponding U.S. Appl. No. 17/599,518 dated Aug. 16, 2023.

* cited by examiner

S104A

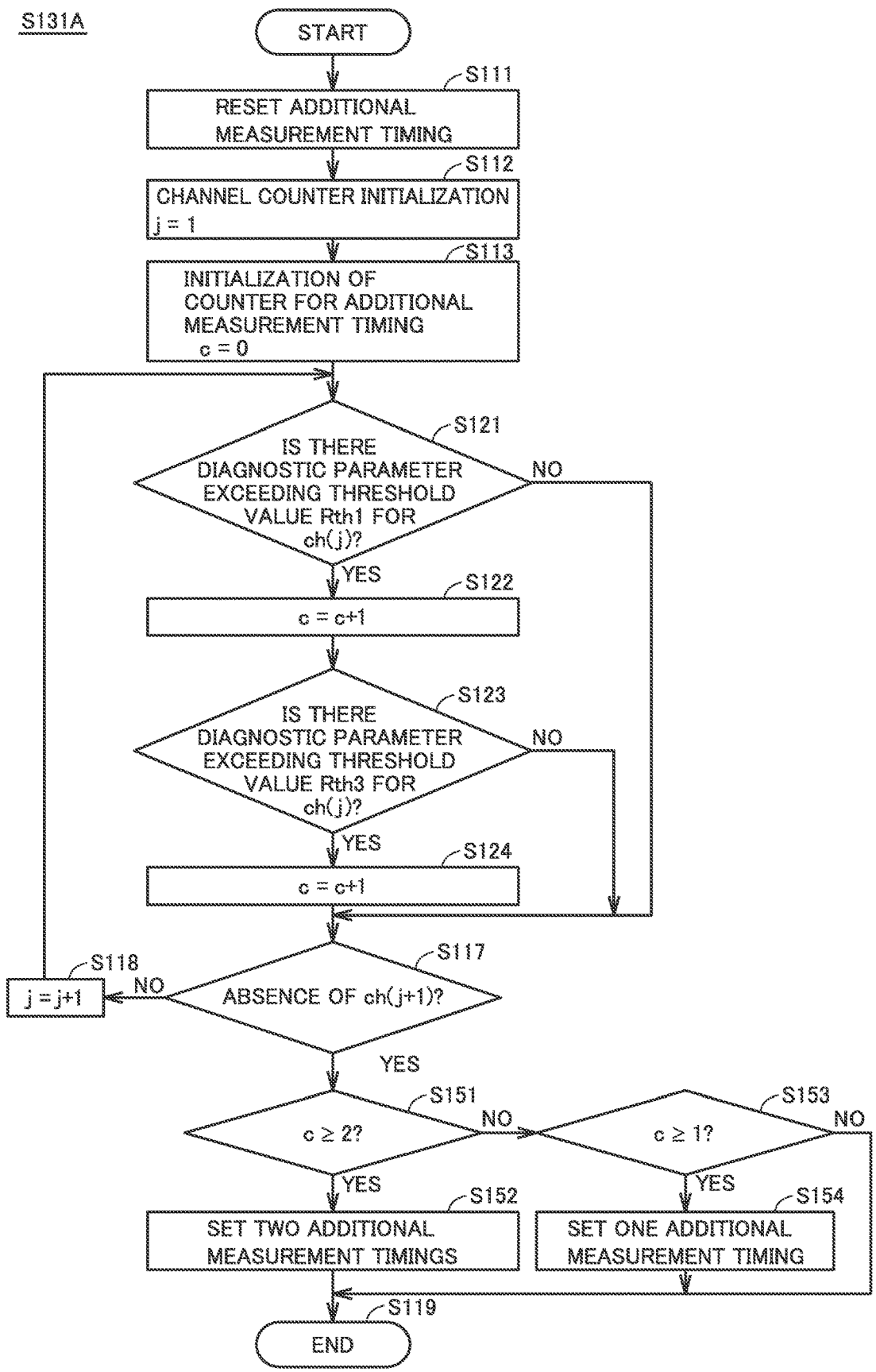

CONDITION MONITORING SYSTEM

CROSS REFERENCE TO RELATED APPLICATIONS

This application is a Continuation of U.S. patent application Ser. No. 17/599,518, filed on Sep. 28, 2021, which is the U.S. National Phase under 35 U.S.C. § 371 of International Application No. PCT/JP2020/009556, filed on Mar. 6, 2020, which claims the benefit of Japanese Patent Application No. 2019-062680, dated Mar. 28, 2019, and Japanese Patent Application No. 2020-023495, dated Feb. 14, 2020, the entire contents of each are hereby incorporated by reference in their entirety.

TECHNICAL FIELD

This invention relates to a condition monitoring system and particularly to a condition monitoring system for a power generation apparatus.

BACKGROUND ART

A wind turbine generator has attracted attention as an environment friendly power generation apparatus. In the wind turbine generator, a blade that converts wind power into rotational force and a nacelle in which a conversion device that converts rotational force into electric power is stored are disposed at a high position (for example, several ten meters above the ground) on a mast. In each wind turbine generator, a condition thereof is monitored using data collected from various sensors. The condition is often monitored from a remote location through a communication line or the like.

Japanese Patent Laying-Open No. 2009-287564 (PTL 1), Japanese Patent Laying-Open No. 2013-185507 (PTL 2), and Japanese Patent Laying-Open No. 2018-060387 (PTL 3) each disclose an exemplary condition monitoring system for a wind turbine generator.

CITATION LIST

Patent Literature

PTL 1: Japanese Patent Laying-Open No. 2009-287564
PTL 2: Japanese Patent Laying-Open No. 2013-185507
PTL 3: Japanese Patent Laying-Open No. 2018-060387
PTL 4: Japanese Patent No. 3882328

SUMMARY OF INVENTION

Technical Problem

According to a technique described in Japanese Patent Laying-Open No. 2009-287564 (PTL 1), output from a wind turbine generator is controlled depending on an ambient condition around the wind turbine generator. Damage to a rotating machine (a gearbox or the like) included in the wind turbine generator, however, is not taken into account as a factor for output control.

When damage to the rotating machine (the gearbox or the like) included in the wind turbine generator is suspected, the machine should be replaced or maintained. During works for such a purpose, operation of the generator is stopped and electric power cannot be generated. Therefore, a power generation business loses its profit.

When operation is continued with the damaged rotating machine, damage progresses, sporadic failure occurs, and the generator has to inevitably stop operation. In that case, a maintenance plan is drawn up and arrangement for replacing the machine is made after the generator stops operation, and therefore downtime may be long.

In order to avoid problems above, the power generation business may decide to continue operation with output from the generator being lower than rating. With output being suppressed, the rotation speed is lower than in operations at the rating, and progress of damage also becomes more gradual than in operations at the rating. Electric power can thus be generated while progress of damage is suppressed.

In operation with the output being suppressed as above, from when and how much output is to be suppressed is determined by a human, for example, based on unusual sound from the machine or wear debris of a metal contained in grease or lubricating oil. Since control is based on determination by a human, it may not be optimal. For example, operation at output higher than optimal output or operation at low output on the contrary may be possible.

Output may be controlled by a monitoring system (supervisory control and data acquisition (SCADA)) mounted on the wind turbine generator. Data collected by the SCADA, however, relates to an operating condition such as a wind direction, a volume of wind, an amount of power generation, and a rotation speed, and vibration of the rotating machine is not collected. Since a sign of damage to a bearing or a gear appears in vibration in a high-frequency band, it is difficult with the SCADA to achieve output control in conformity with a degree of damage to the rotating machine.

The present invention was made to solve such problems, and an object thereof is to provide a condition monitoring system that presents an amount of suppression in accordance with a state of damage in a power generation apparatus.

Solution to Problem

The present disclosure relates to a condition monitoring system that monitors a condition of a wind turbine generator. The condition monitoring system includes a monitoring terminal, an acceleration sensor, and a data processor. The data processor calculates a diagnostic parameter from data measured by the acceleration sensor, determines a degree of damage to a bearing or a gear included in the wind turbine generator based on the diagnostic parameter, and controls the monitoring terminal to show information indicating a degree of suppression of electric power generated by the wind turbine generator in accordance with the degree of damage to the bearing or the gear.

Preferably, the data processor includes a memory and a computing unit that causes the memory to store the number of times of excess of magnitude of the diagnostic parameter over a first threshold value. The computing unit does not allow the monitoring terminal to show the information indicating the degree of suppression until the number of times reaches a predetermined first number, and when the number of times is equal to or larger than the predetermined first number, the computing unit allows the monitoring terminal to show the information indicating the degree of suppression.

More preferably, when the diagnostic parameter exceeds a second threshold value larger than the first threshold value, the computing unit provides a signal indicating stop of operation of the wind turbine generator to a controller that controls operation of the wind turbine generator.

Preferably, the data processor determines a time period in calculating a rate of change over time in diagnostic parameter based on a product of a rotation speed of a rotating element of the wind turbine generator and power generation output. When the rate of change in diagnostic parameter in the time period is higher than the rate of change in diagnostic parameter in a previous time period, the data processor calculates the degree of suppression and controls the monitoring terminal to show the information on which the calculated degree of suppression is reflected.

Preferably, the data processor increases a frequency of measurement by the acceleration sensor when magnitude of the diagnostic parameter exceeds a threshold value.

More preferably, the acceleration sensor includes a plurality of acceleration sensor elements. The data processor calculates the diagnostic parameter for each piece of data measured by each of the plurality of acceleration sensor elements. The data processor increases the frequency of measurement by an acceleration sensor element in which magnitude of a corresponding diagnostic parameter exceeds the threshold value among the plurality of acceleration sensor elements, and does not change the frequency of measurement by an acceleration sensor element in which magnitude of a corresponding diagnostic parameter does not exceed the threshold value among the plurality of acceleration sensor elements.

More preferably, the acceleration sensor includes a plurality of acceleration sensor elements. The data processor calculates the diagnostic parameter for each piece of data measured by each of the plurality of acceleration sensor elements. When there is an acceleration sensor element in which magnitude of a corresponding diagnostic parameter exceeds the threshold value among the plurality of acceleration sensor elements, the data processor increases the frequency of measurement by the plurality of acceleration sensor elements.

Advantageous Effects of Invention

According to the present invention, an amount of suppression in conformity with a state of damage in a power generation apparatus is presented. Therefore, without relying on intuition of an operator in a power generation business, an amount of suppression at which power generation business is continued until maintenance timing is set while progress of damage in the power generation apparatus is suppressed, and sporadic failure can be avoided.

BRIEF DESCRIPTION OF DRAWINGS

FIG. 16 is a flowchart for illustrating processing for setting additional measurement timing performed in a modification of the third embodiment.

DESCRIPTION OF EMBODIMENTS

Figure 1:
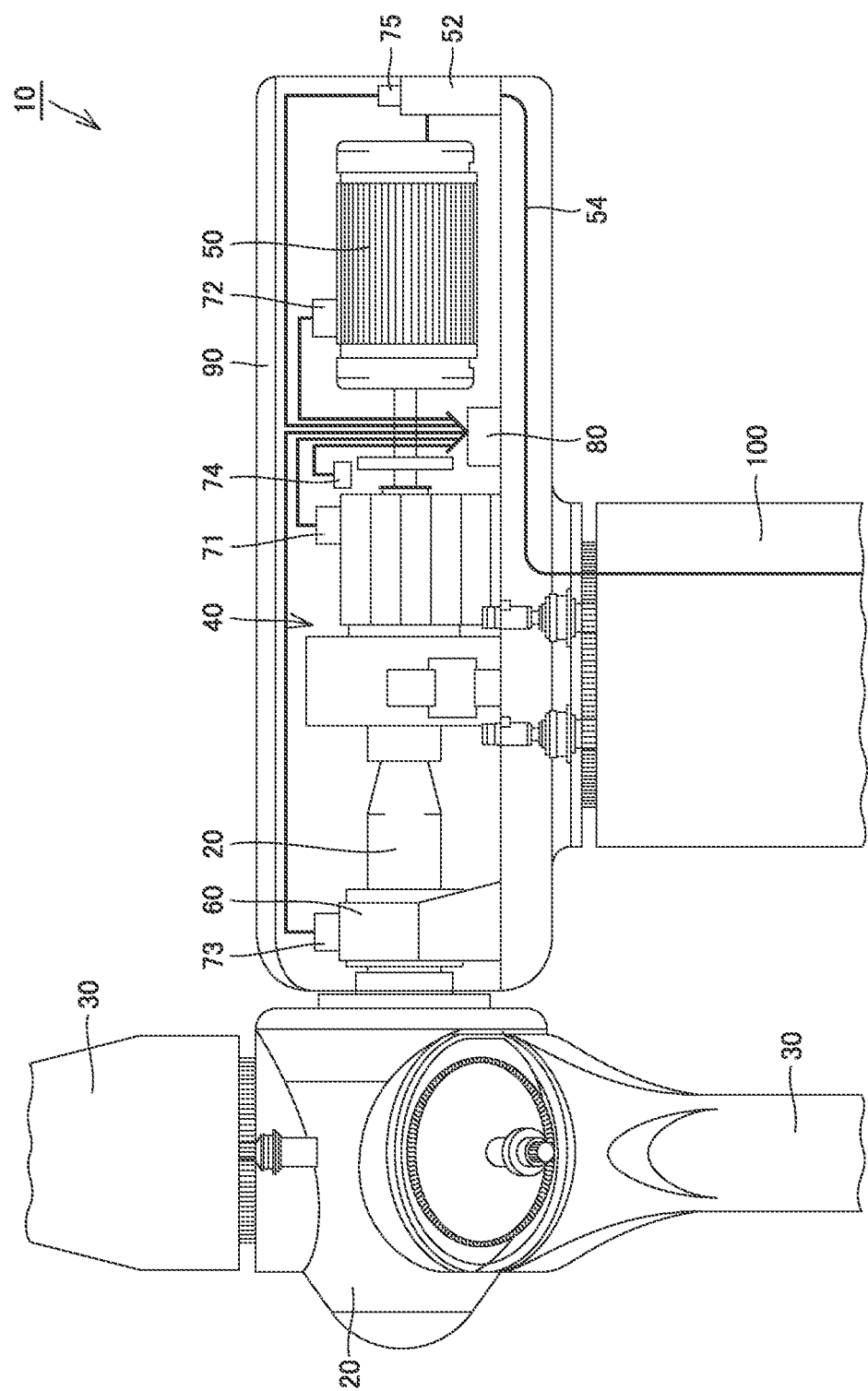
FIG. 1 is a diagram schematically showing a construction of a wind turbine generator to which a condition monitoring apparatus according to an embodiment of this invention is applied.

An embodiment of the present invention will be described below with reference to the drawings. The same or corresponding elements in the drawings below have the same reference characters allotted and description thereof will not be repeated.

First Embodiment

FIG. 1 is a diagram schematically showing a construction of a wind turbine generator to which a condition monitoring apparatus according to an embodiment of this invention is applied. Referring to FIG. 1, a wind turbine generator 10 includes a main shaft 20, a blade 30, a gearbox 40, a generator 50, a control board 52, an electric power transmission line 54, and a bearing 60 for the main shaft (which is simply referred to as a "bearing" below).

Gearbox 40, generator 50, control board 52, and bearing 60 are stored in a nacelle 90, and nacelle 90 is supported by a tower 100.

Main shaft 20 is inserted in nacelle 90, connected to an input shaft of gearbox 40, and rotatably supported by bearing 60. Main shaft 20 transmits rotation torque generated by blade 30 which receives wind power to the input shaft of gearbox 40. Blade 30 is provided at a tip end of main shaft 20 to convert wind power to rotation torque and to transmit rotation torque to main shaft 20.

Bearing 60 is fixed in nacelle 90 and rotatably supports main shaft 20. Bearing 60 is implemented by a rolling bearing, and implemented, for example, by a spherical roller bearing, a tapered rolling bearing, a cylindrical roller bearing, and a ball bearing. The bearing may be a single-row bearing or a double-row bearing.

Gearbox 40 is provided between main shaft 20 and generator 50, and increases a rotation speed of main shaft 20 and outputs the increased rotation speed to generator 50. By way of example, gearbox 40 is implemented by a step-up gear mechanism including a planetary gear, an intermediate shaft, and a high-speed shaft. Generator 50 is connected to an output shaft of gearbox 40 and generates electric power by using rotation torque received from gearbox 40. Generator 50 is implemented, for example, by an induction generator.

Control board 52 includes an inverter (not shown). The inverter converts electric power generated by generator 50 into a system voltage and frequency and outputs the same to electric power transmission line 54 connected to the system.

In order to monitor wind turbine generator 10, a condition monitoring system is provided in wind turbine generator 10.

Figure 2:
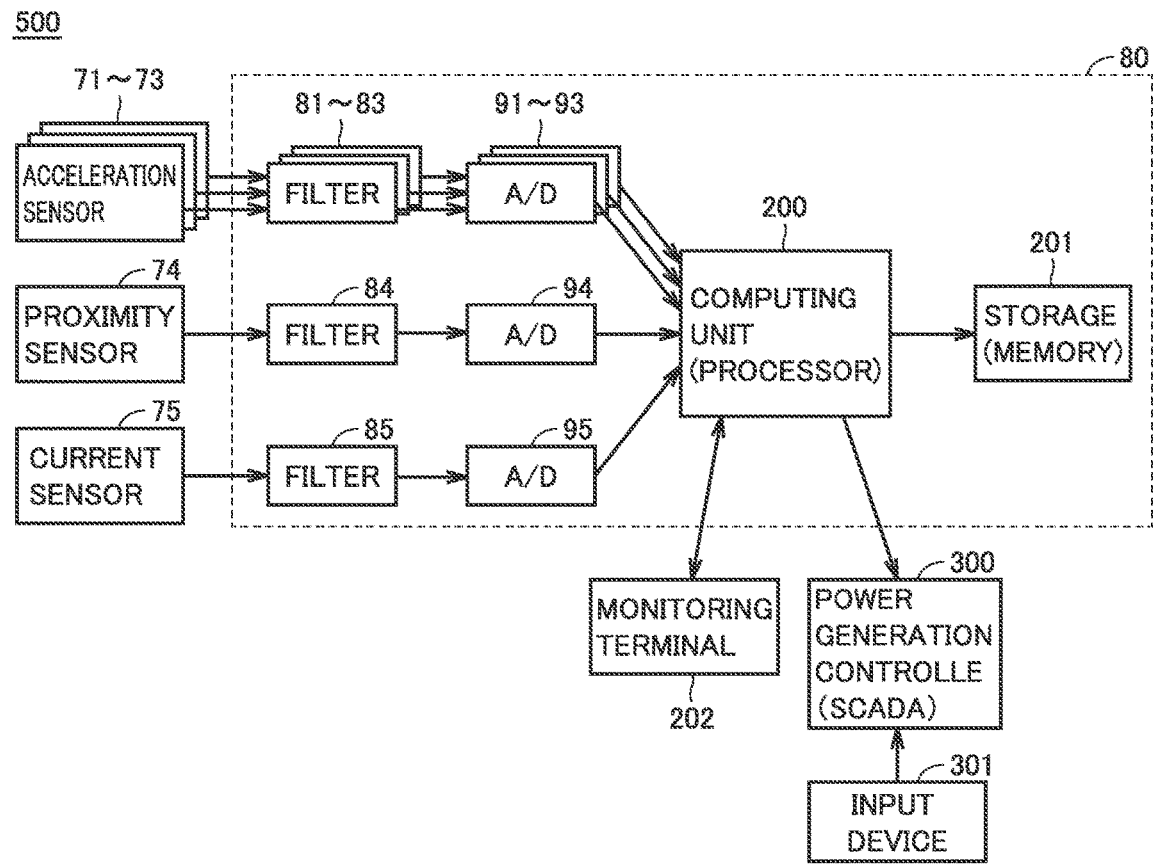
FIG. 2 is a functional block diagram showing a configuration of the condition monitoring system.

FIG. 2 is a functional block diagram showing a configuration of the condition monitoring system. Referring to FIGS. 1 and 2, a condition monitoring system 500 includes acceleration sensors 71 to 73, a proximity sensor 74, a current sensor 75, a data processor 80, and a monitoring terminal 202. Acceleration sensors 71 to 73, proximity sensor 74, current sensor 75, and data processor 80 are stored in nacelle 90. These elements may be connected to one another through wires or wirelessly.

Acceleration sensors 71 to 73 are provided in respective rotating machines such as gearbox 40, generator 50, and bearing 60 in nacelle 90 of wind turbine generator 10, and detect vibration thereof and output detected vibration values to data processor 80. Acceleration sensors 71 to 73 are preferably provided at positions where vibration of a bearing or a gear included in each rotating machine can be detected.

Acceleration sensors 71 to 73 are used in an application for sensing damage to the bearing or the gear in the rotating machine. Therefore, a sensor capable of measuring vibration in a high-frequency band (2 kHz to 10 kHz) where a sign of damage appears is desirable.

Proximity sensor 74 is used in an application for detecting the number of rotations of wind turbine generator 10. The proximity sensor is desirably provided at a position where it can detect rotation of a shaft of generator 50. Proximity sensor 74 detects a rotation speed of the wind turbine generator, for example, by detection of a cycle in which a protrusion such as a head of a bolt of the shaft of generator 50 or a hole is proximate as the shaft rotates.

Current sensor 75 is provided in nacelle 90 for detecting power generation output from wind turbine generator 10.

Data processor 80 includes filters 81 to 85 that receive outputs from acceleration sensors 71 to 73, proximity sensor 74, and current sensor 75 and remove noise therefrom, A/D converters 91 to 95 that convert signals from which noise has been removed into digital values, a computing unit (processor) 200, and a memory 201 serving as a storage.

Computing unit 200 regularly (for example, every two hours) conducts measurement with each sensor. For data collected by acceleration sensors 71 to 73, computing unit 200 calculates a plurality of diagnostic parameters R in correspondence with the sensors. Diagnostic parameter R is highly sensitive to detection of damage to the bearing or the gear. In order to set equal measurement conditions, diagnostic parameter R is calculated only when the rotation speed and power generation output exceed set values.

For example, feature values such as a root-mean-square value RMS, a modulation factor MOF, a peak value Peak, and an envelope spectrum peak value EnvPeak given in expressions below can be employed as diagnostic parameters R.

$$\text{RMS} = \sqrt{\frac{1}{T}\int_{t_1}^{t_2} v(t)^2 dt} \quad (1)$$

The expression (1) expresses root-mean-square value RMS, and in the expression, t represents time, T represents a calculation section t2–t1, and v(t) represents a time waveform.

$$\text{MOF} = \sqrt{\frac{1}{T}\int_{t_1}^{t_2} v_{AM}(t)^2 dt} \quad (2)$$

The expression (2) expresses modulation factor MOF, and in the expression, $V_{AM}(t)$ represents an envelope of a time waveform.

$$\text{Peak} = |v(t)|\max \quad (3)$$

The expression (3) expresses peak value Peak.

$$\text{EnvPeak} = |V_{AM}(2\pi f)|\max \quad (4)$$

The expression (4) expresses an envelope spectrum peak value. In the expression, f represents a frequency and $V_{AM}(2\pi f)$ represents an envelope spectrum. The envelope spectrum is expressed in an expression (5) below.

$$V_{AM}(2\pi f) = \int_{-\infty}^{\infty} v_{AM}(t) e^{-j2\pi f t} dt \quad (5)$$

Computing unit 200 is configured to be in coordination with a power generation controller 300 that controls power generation by wind turbine generator 10. For example, when damage in wind turbine generator 10 progresses, computing unit 200 transmits a stop signal to stop power generation to power generation controller 300. Power generation controller 300 represents a kind of supervisory control and data acquisition (SCADA).

Figure 3:
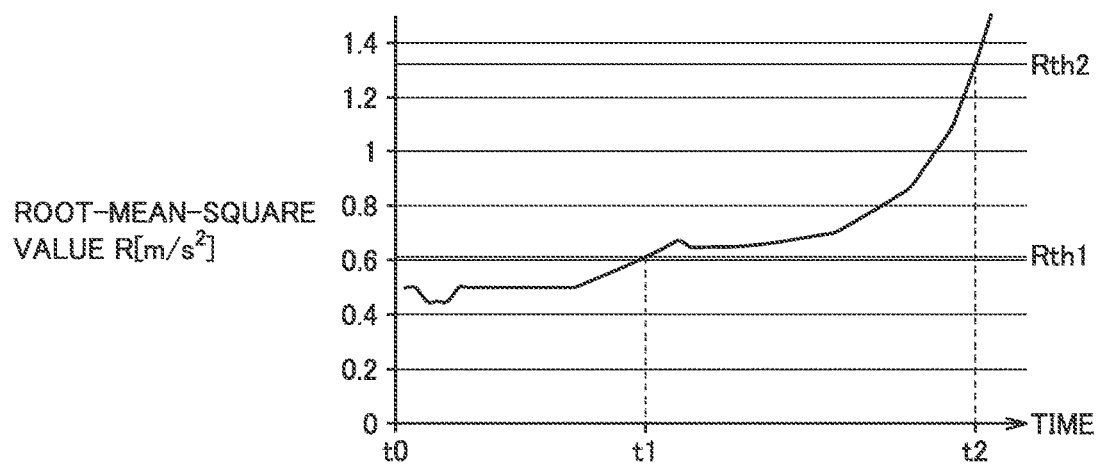
FIG. 3 is a diagram for illustrating a threshold value set when a root-mean-square value RMS is adopted as a diagnostic parameter R.

FIG. 3 is a diagram for illustrating a threshold value set when root-mean-square value RMS is adopted as diagnostic parameter R. As shown in FIG. 3, two types of threshold values are set for diagnostic parameter R. The two types of threshold values may arbitrarily be set or generated based on measurement data for a certain period. For example, a threshold value Rth1 (an initial damage detection threshold value) and a threshold value Rth2 (a use limit threshold value) are set.

Threshold value Rth1 is a threshold value for detecting initial damage. Whether the bearing or the gear is normal (no damage) or has been slightly damaged can be determined based on threshold value Rth1.

Threshold value Rth2 is a threshold value for detection of progress of damage to such an extent as requiring replacement of the bearing or the gear. Threshold value Rth2 is larger than threshold value Rth1 for detection of initial damage.

Figure 4:
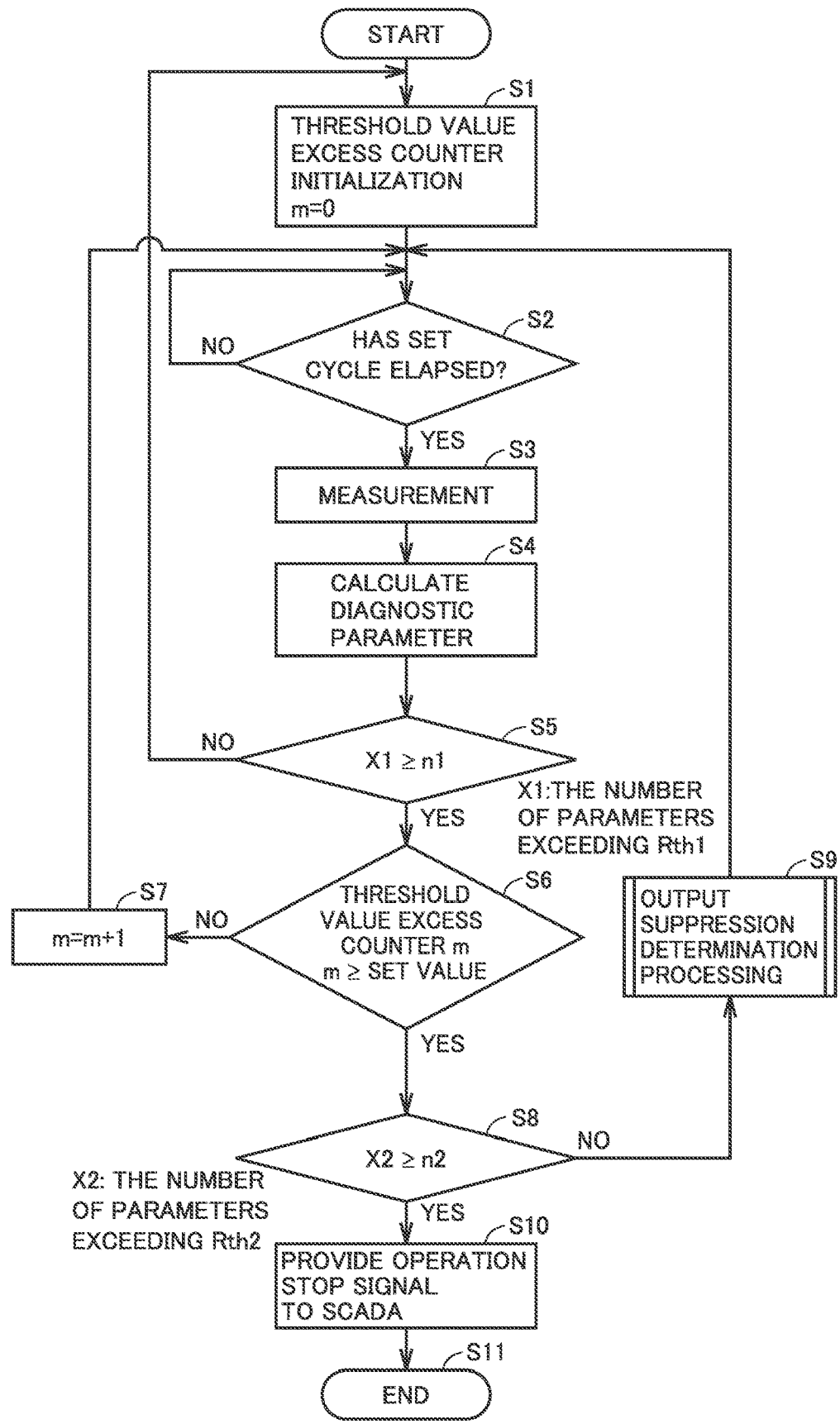
FIG. 4 is a flowchart for illustrating processing performed immediately after activation of the condition monitoring system in a first embodiment.

FIG. 4 is a flowchart for illustrating processing performed immediately after activation of the condition monitoring system in a first embodiment. Referring to FIGS. 2 and 4, in step S1, computing unit 200 initializes a count value m of a threshold value excess counter to m=0. In succession, computing unit 200 stands by in step S2 until a measurement cycle (for example, two hours) set in advance elapses, and in step S3, computing unit 200 conducts measurement with acceleration sensors 71 to 73. Then, in step S4, the computing unit calculates diagnostic parameter R (illustrated in FIG. 3) from data obtained in measurement.

In succession, in step S5, computing unit 200 determines whether or not the number X1 of diagnostic parameters R exceeding threshold value Rth1 is equal to or larger than n1. In the example in FIG. 1, three vibration sensors are provided, and hence there are also three diagnostic parameters R. A larger number of vibration sensors, however, may be provided. n1 which is a criterion value is an integer equal to or larger than 1, and n1 can be determined as appropriate depending on the number of vibration sensors. When relation of X1≥n1 is not satisfied (NO in S5), the process returns to step S1. When relation of X1≥n1 is satisfied (YES in S5), in step S6, computing unit 200 determines whether or not count value m of the threshold value excess counter is equal to or larger than a set value.

When m is smaller than the set value (NO in S6), in step S7, 1 is added to count value m, and processing in step S2 or later is performed again. By doing so, even though the threshold value is temporarily exceeded due to noise introduced in measurement data, output suppression determination processing in step S9 is not performed.

When at least the set number (n1) of diagnostic parameters R exceed threshold value Rth1 consecutively as many times as the set value (YES in S5 and YES in S6), in step S8, computing unit 200 determines whether or not the bearing or the gear has gone beyond the limit of use. Specifically, computing unit 200 determines whether or not there are at least n2 diagnostic parameters R exceeding threshold value Rth2.

When the number of diagnostic parameters R exceeding threshold value Rth2 is smaller than n2 (NO in S8), in step S9, computing unit 200 performs output suppression determination processing, and controls monitoring terminal 202 to show a recommended amount of output suppression. An operator determines output from the generator with reference to the amount of suppression shown on monitoring terminal 202 and continues operation of the generator. As operation of the generator is continued, processing in step S2 or later is performed again.

When the number X2 of diagnostic parameters exceeding threshold value Rth2 is equal to or larger than n2 in step S8, in step S10, computing unit 200 determines that timing to replace the bearing or the gear has come and provides an operation stop signal to the SCADA. Then, control ends in step S11. Thus, for example, when the degree of damage to the bearing or the gear increases to such an extent as exceeding the limit value in the absence of the operator such as during night, operation of the wind turbine generator can automatically be stopped. Damage that necessitates large-scale maintenance can thus be avoided.

Figure 5:
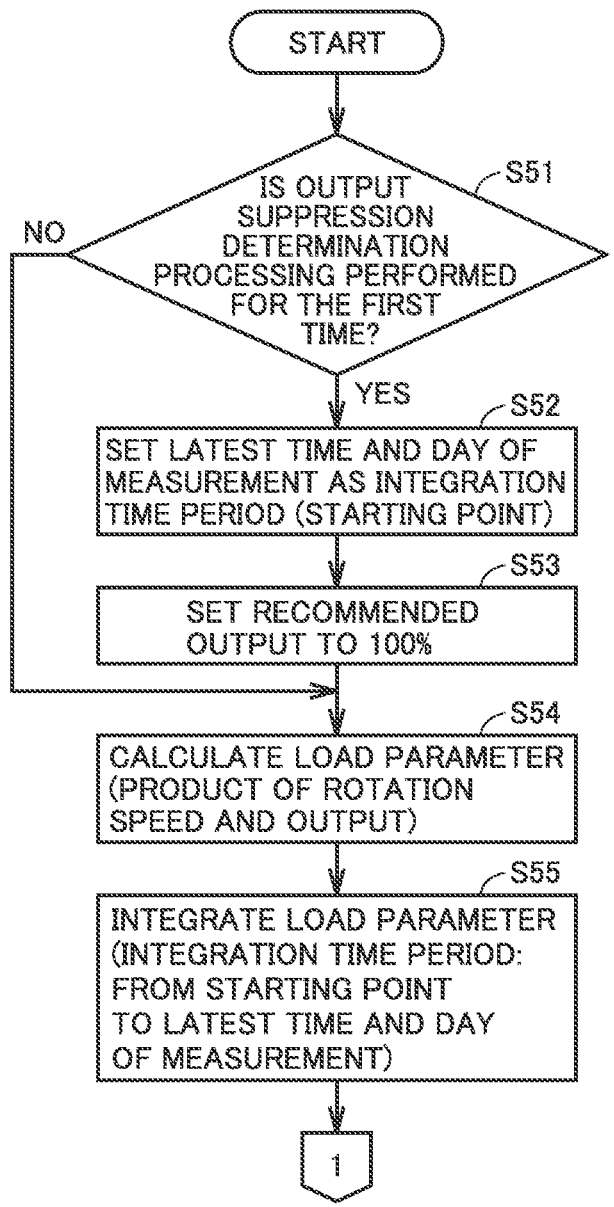
FIG. 5 is a diagram showing a former half of a flowchart of output suppression determination processing performed in step S9.
Figure 6:
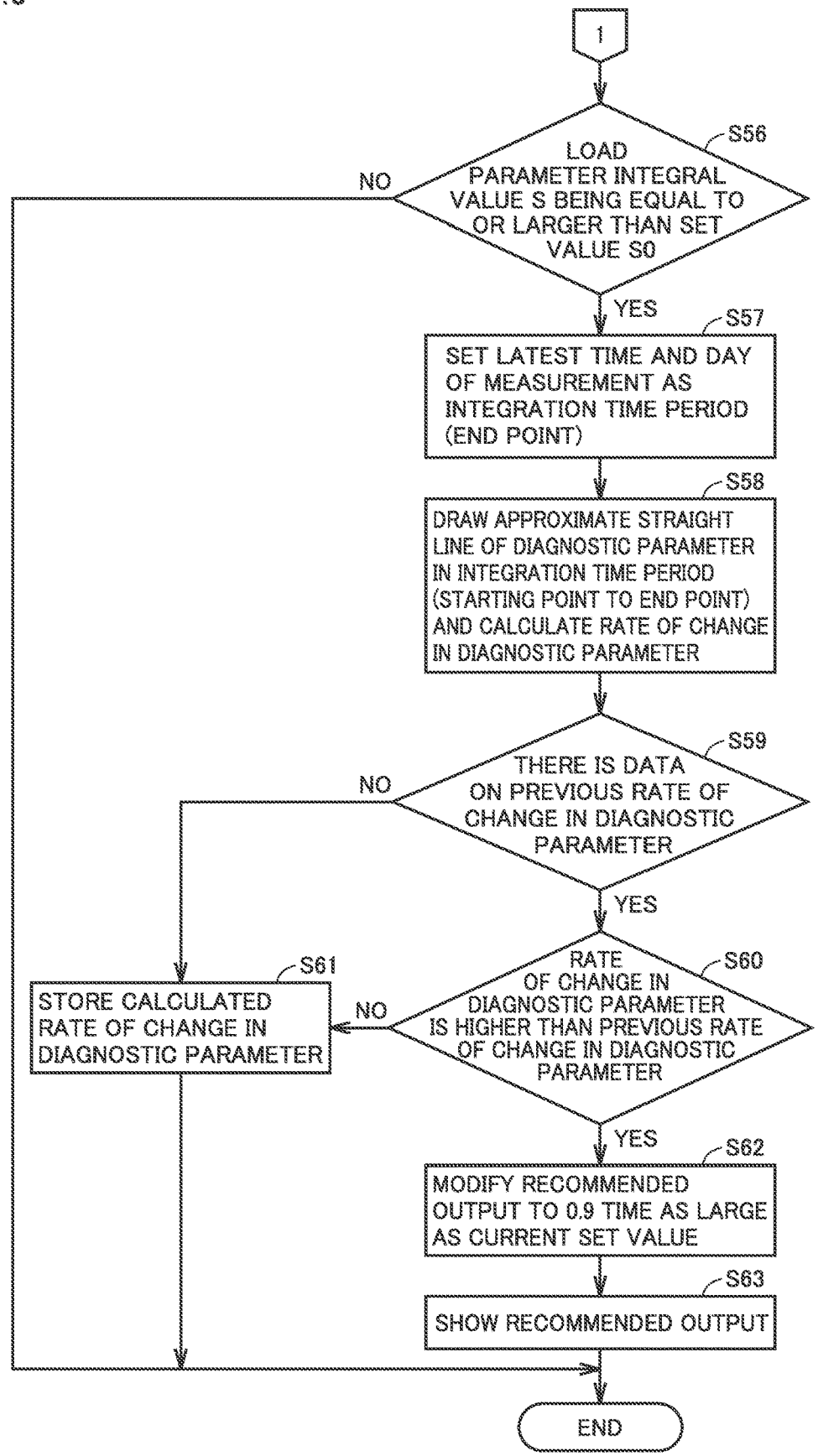
FIG. 6 is a diagram showing a latter half of the flowchart of output suppression determination processing performed in step S9.

FIG. 5 is a diagram showing a former half of a flowchart of output suppression determination processing performed in step S9. FIG. 6 is a diagram showing a latter half of the flowchart of output suppression determination processing performed in step S9. In the output suppression determination processing, recommended output is shown in accordance with the flowcharts in FIGS. 5 and 6.

In step S51, computing unit 200 determines whether or not output suppression determination processing is performed for the first time. When output suppression determination processing is performed for the first time (YES in S51), in step S52, computing unit 200 sets the latest time and day of measurement as the starting point of an integration time period. In succession, in step S53, computing unit 200 sets recommended output to be presented to the operator to 100%, and the process proceeds to step S54. When there is a record that output suppression determination processing has already been performed (NO in S51), computing unit 200 skips processing in steps S52 and S53, and the process proceeds to step S54.

In step S54, computing unit 200 calculates a product (a load parameter) of the rotation speed and power generation output. In step S55, load parameter P is integrated with respect to time.

Figure 7:
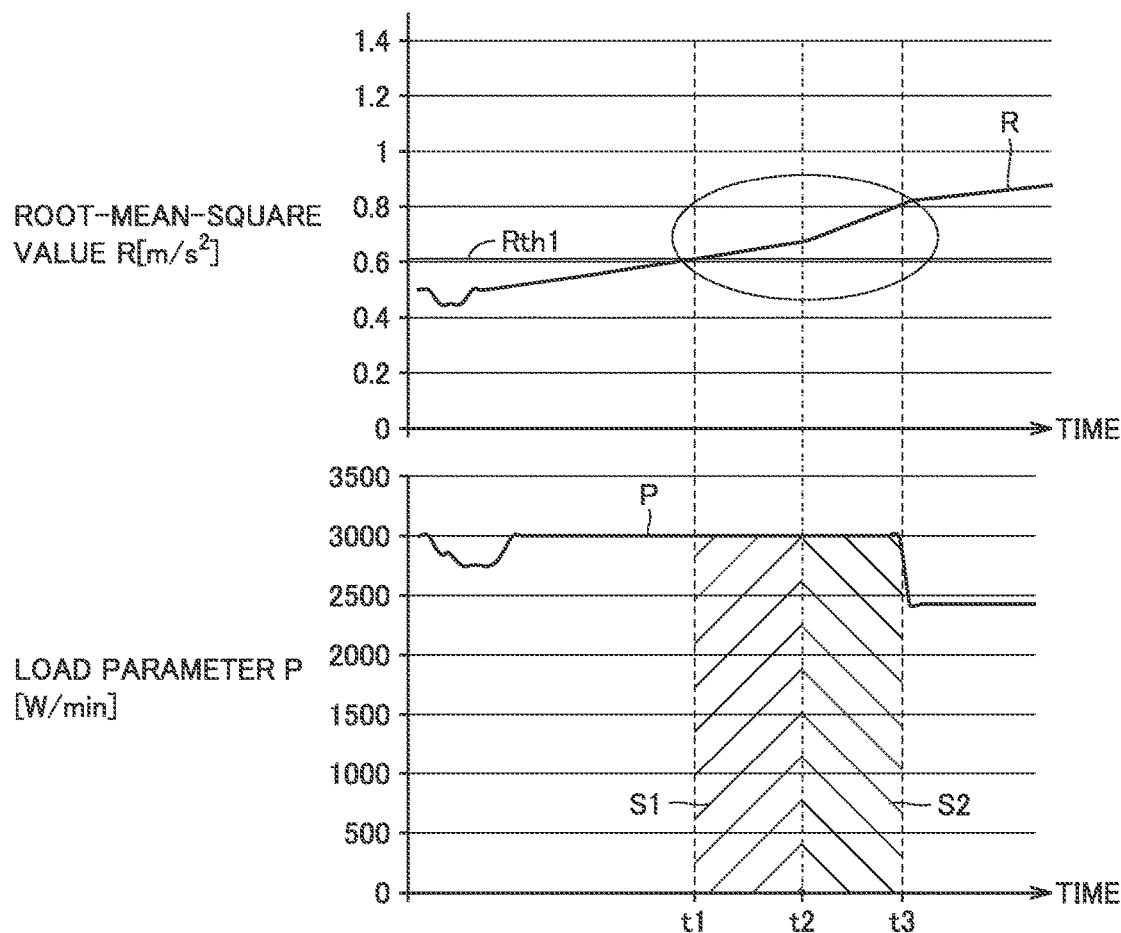
FIG. 7 is a diagram for illustrating an integral of a load parameter P.

FIG. 7 is a diagram for illustrating an integral of load parameter P. In FIG. 7, the ordinate represents diagnostic parameter R and load parameter P, and the abscissa represents time and day. For example, each time an integral value S calculated with time t1 at which initial damage threshold value Rth1 is exceeded for the first time being defined as the starting point exceeds a value S0 set in advance, a rate of change dR/dt (time period: an integration time period of a load parameter) in diagnostic parameter R is calculated.

For example, when the integral value exceeds value S0 set in advance at the time when integral value S attains to S=S1 at time t2, rate of change dR/dt is calculated at this time point. When the integral value exceeds value S0 set in advance at the time when integral value S attains to S=S2 at time t3 with time t2 being defined as the next starting point, rate of change dR/dt is calculated again at this time point.

Figure 8:
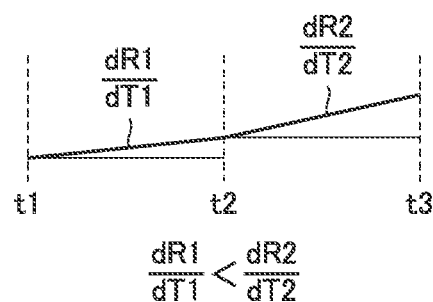
FIG. 8 is a diagram for illustrating calculation of a rate of change in diagnostic parameter R.

FIG. 8 is a diagram for illustrating calculation of a rate of change in diagnostic parameter R. Referring to FIGS. 7 and 8, a rate of change dR1/dT1 is calculated at time t2 and a rate of change dR2/dT2 is calculated at time t3. Thus, each time integral value S of load parameter P exceeds set value S0 set in advance (YES in S56), computing unit 200 sets the latest time of measurement as the end point of the integration time period (step S57), draws an approximate straight line between the starting point and the end point, and calculates rate of change dR/dt (time period: the integration time period of the load parameter) in diagnostic parameter R (step S58).

In succession, in step S59, computing unit 200 determines whether or not there is data on a previous rate of change in diagnostic parameter R. When there is data on the previous rate of change in diagnostic parameter R (YES in S59), in step S60, computing unit 200 determines whether or not the rate of change in diagnostic parameter R is higher than the rate of change in a previous time period.

When there is no data on the previous rate of change in diagnostic parameter R in step S59 and when the rate of change in diagnostic parameter R is equal to or lower than the rate of change in the previous time period in step S60, in step S61, computing unit 200 has the calculated rate of change in diagnostic parameter R stored in memory 201, and in step S63, computing unit 200 controls monitoring terminal 202 to show recommended output the same as previous recommended output as information to the effect that operation output be maintained to a previous state.

When the rate of change in diagnostic parameter R is higher than the rate of change in the previous time period (YES in S60), computing unit 200 determines that damage has progressed. In step S62, computing unit 200 modifies recommended output to 0.9 time as large as the current set value, and in step S63, computing unit 200 controls monitoring terminal 202 to show modified recommended output as the information to the effect that operation output be suppressed. Note that 0.9 time is by way of example of suppression. Multiplication by a value smaller than 1 other than 0.9 or subtraction of prescribed electric power in step S62 may be applicable.

FIGS. 7 and 8 show an example in which load parameter P which is a product of the rotation speed and an amount of power generation is calculated and generated electric power is suppressed depending on magnitude of the rate of change. In FIG. 7, time and day of measurement t1 when output suppression determination processing is performed for the first time is set as the "starting point." Thereafter, each time output suppression determination processing is performed, integral value S of load parameter P is calculated in a time period from the "starting point" to the latest time and day of measurement.

When integral value S1 of load parameter P exceeds set value S0 at time t2, the "starting point" of the integration time period is updated. In FIG. 7, the latest time and day of measurement t2 at the time point when integral value S1 exceeds set value S0 is set as the new "starting point" and calculation of integral value S2 is started. The latest time and day of measurement t3 at the time point when integral value S2 exceeds set value S0 is set as the new "starting point."

Then, rate of change dR/dt in diagnostic parameter R in each integration time period is calculated. As shown in FIG. 8, the rate of change in diagnostic parameter R can be considered as inclination of the approximate straight line.

The calculated rate of change is compared with the rate of change calculated in the previous time period. FIG. 8 shows comparison between dR1/dT1 calculated in a time period dT1=t1 to t2 and dR2/dT2 calculated in a time period dT2=t2 to t3.

When the rate of change in the present time period is compared with the rate of change in the previous time period and the rate of change in the present time period is higher, computing unit 200 determines that damage has progressed and controls monitoring terminal 202 to show information (recommended output) to the effect that output be suppressed. For example, with an initial value of recommended output being defined as 100%, the recommended output is lowered by 10% each time damage is determined as having progressed. In FIG. 8, since relation of dR1/dT1<dR2/dT2 is satisfied, damage is determined as having progressed. Recommended output at this time is set to 90% (=100%×0.9). Consequently, in FIG. 7, as a result of suppression of output to 90% by the operator at time t3, the amount of power generation lowers and load parameter P also lowers by one level.

When at least the set number (n2) of diagnostic parameters R exceed use limit threshold value Rth2, computing unit 200 determines that timing to replace the bearing or the gear has come, and provides the operation stop signal to SCADA 300. Therefore, even when damage progresses in the absence of monitoring by the operator, operation can be stopped before the wind turbine generator is significantly damaged.

The first embodiment is summarized with reference to FIGS. 1 to 8 again. The present disclosure relates to the condition monitoring system that monitors a condition of wind turbine generator 10. Condition monitoring system 500 includes monitoring terminal 202, acceleration sensors 71 to 73, and data processor 80. Data processor 80 calculates diagnostic parameter R from data measured by acceleration sensors 71 to 73, determines a degree of damage to the bearing or the gear included in wind turbine generator 10 based on diagnostic parameter R, and controls monitoring terminal 202 to show information indicating a degree of suppression of electric power generated by wind turbine generator 10 in accordance with a degree of damage to the bearing or the gear.

The degree of damage to the bearing or the gear is determined based on the number of times m of excess of the diagnostic parameter over threshold value Rth1 and the rate of change in diagnostic parameter. As shown in FIG. 4, when the number of times m of excess over threshold value Rth1 is equal to or larger than the set value, data processor 80 performs output suppression determination processing. When the rate of change in diagnostic parameter is higher than the previous rate of change as shown in step S60 in FIG. 6, data processor 80 determines that damage has progressed and sets recommended output to be lower than current output.

According to condition monitoring system 500 in the present embodiment, wind turbine generator 10 can generate electric power while damage to the rotating machine is suppressed. Thus, possibility of sporadic severe failure can be lower and downtime can be shorter than in operation continued at rated output.

Japan has many windy days in winter, and there is a demand for operation of wind turbine generators to the greatest extent possible. With condition monitoring system 500 in the present embodiment, the wind turbine generator in which damage to the rotating machine is suspected can also operate with its output being suppressed to such an extent as not permitting significant progress of damage. Therefore, the wind turbine generator can operate at timing suitable for power generation, which leads to profit of the power generation business.

Preferably, data processor 80 includes memory 201 and computing unit 200 that causes the memory to store the number of times m of excess of magnitude of diagnostic parameter R over first threshold value Rth1. Computing unit 200 does not allow the monitoring terminal to show information indicating a degree of suppression until the number of times m reaches the predetermined first number (NO in S6), and when the number of times m is equal to or larger than the predetermined first number (YES in S6), computing unit 200 allows the monitoring terminal to show the information indicating the degree of suppression.

By doing so, influence by increase in vibration due to temporary strong wind is eliminated, and information correctly indicating the degree of suppression at the time when damage is caused can be shown.

More preferably, when diagnostic parameter R exceeds second threshold value Rth2 larger than first threshold value Rth1 (YES in S8), computing unit 200 provides a signal indicating stop of operation of wind turbine generator 10 to the controller (SCADA 300) that controls operation of wind turbine generator 10.

When it is determined that damage to the rotating machine has further progressed, the condition monitoring system in the present embodiment can automatically stop operation of the wind turbine generator, as being in coordination with the SCADA. Downtime caused by sporadic failure can thus be reduced.

Preferably, data processor 80 determines a time period in calculating the rate of change over time in diagnostic parameter R based on the product of the rotation speed of the rotating element of the wind turbine generator and power generation output. When rate of change dR/dt in diagnostic parameter in the time period is higher than rate of change dR/dt in diagnostic parameter in the previous time period (YES in S60), data processor 80 calculates the degree of suppression and controls monitoring terminal 202 to show information on which the calculated degree of suppression is reflected.

Whether or not damage has progressed can thus be determined.

Second Embodiment

In the first embodiment, an example in which a condition of the rotating machine is monitored, and when damage during a rotation period progresses, the amount of power generation is suppressed or operation is stopped is described. When damage rapidly progresses, however, such a situation may not be grasped simply by regular monitoring. Then, in a second embodiment, when damage is suspected, a frequency of monitoring of a corresponding site is increased, so that even when damage rapidly progresses, a condition of the progress can be monitored. The condition monitoring system in the second embodiment performs processing below, in addition to processing performed by the condition monitoring system in the first embodiment.

Figure 9:
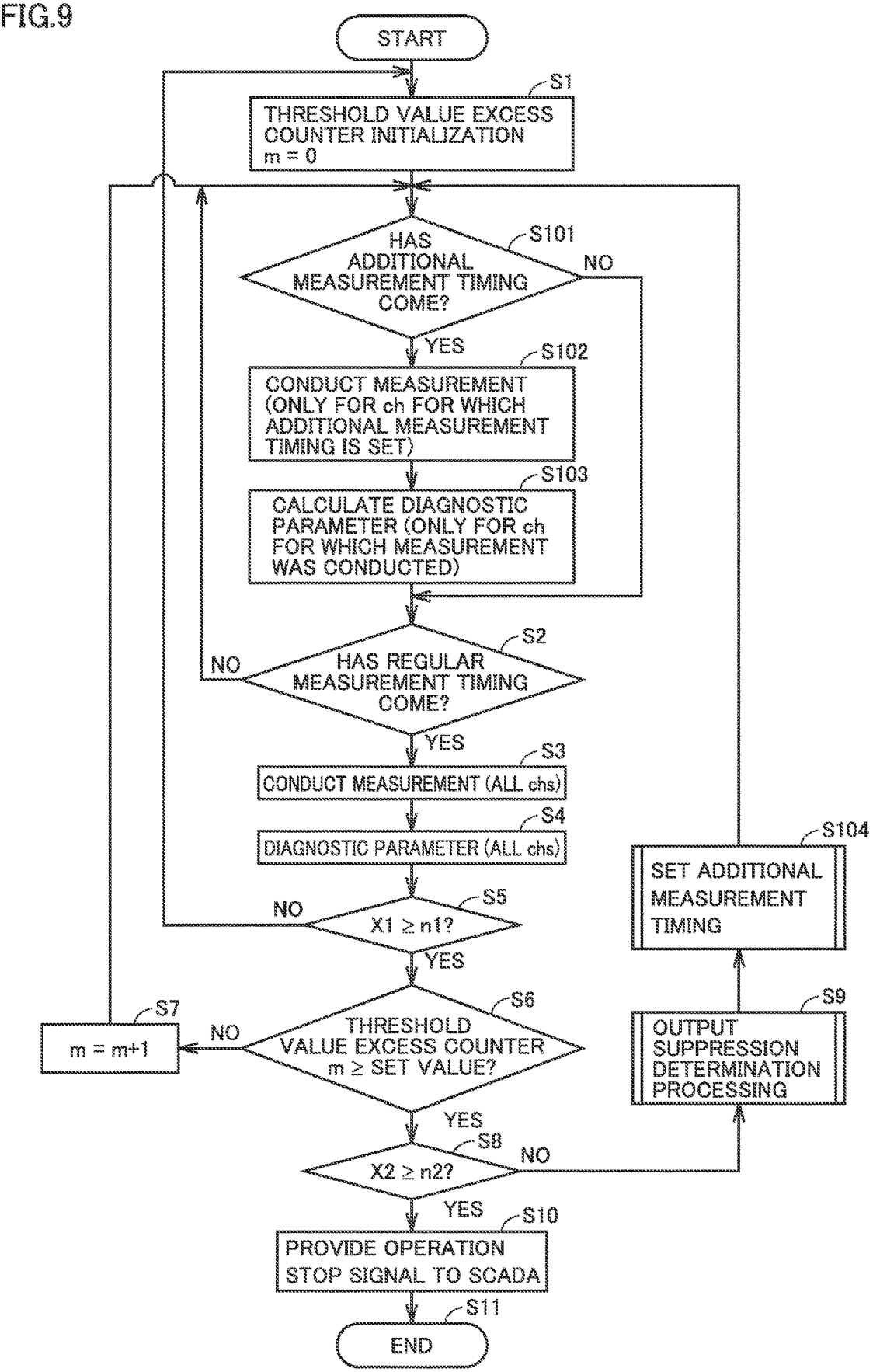
FIG. 9 is a flowchart for illustrating processing performed immediately after activation of the condition monitoring system in a second embodiment.

FIG. 9 is a flowchart for illustrating processing performed immediately after activation of the condition monitoring system in the second embodiment. In the flowchart in FIG. 9, processing in steps S101 to S104 is performed in addition to the processing in the flowchart in FIG. 4.

In the second embodiment, when there is a diagnostic parameter exceeding a specific value (threshold value Rth1) after output suppression determination (detection of initial damage) is made for the first time, timing of measurement by a corresponding acceleration sensor is additionally set. This measurement timing corresponds to timing of measurement conducted in steps S102 and S103 separately from regular measurement in steps S3 and S4 conducted in all channels of the acceleration sensor. Timing of additionally conducted measurement is set in step S104 in FIG. 9.

Then, in step S101, whether or not additional measurement timing has come is determined. When additional measurement timing has come (YES in S101), in step S102, measurement is conducted only in a channel of the acceleration sensor for which additional measurement timing has been set, and in step S103, the diagnostic parameter is calculated.

In the present embodiment, output suppression determination shown in FIGS. 5 and 6 is made only in regular measurement. Measurement data at the additional measurement timing is not used for output suppression determination.

Figure 10:
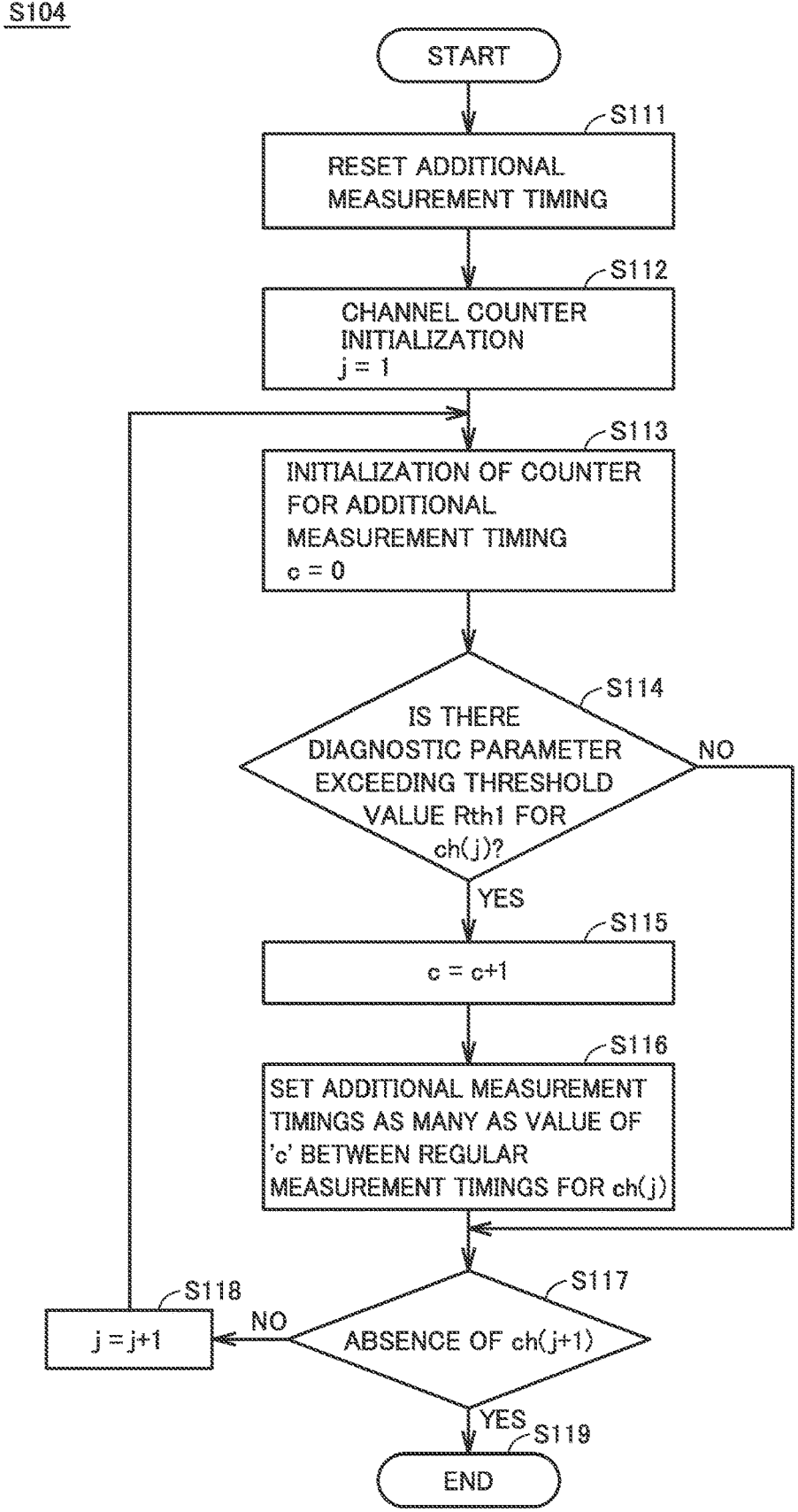
FIG. 10 is a flowchart for illustrating processing for setting additional measurement timing performed in step S104 in FIG. 9.

Additional measurement timing is set for each sensor. FIG. 10 is a flowchart for illustrating processing for setting additional measurement timing performed in step S104 in FIG. 9.

Initially, in step S111, data processor 80 resets additional measurement timing for all measurement channels. Then, in step S112, a channel counter j is initialized. Consequently, j=1 is set. In step S113, a counter c for additional measurement timing is initialized. Consequently, c=0 is set.

In step S114, data processor 80 determines for a jth measurement channel ch(j), whether or not there is a diagnostic parameter exceeding threshold value Rth1. When there is a diagnostic parameter exceeding threshold value Rth1 (YES in S114), in step S115, counter c for additional measurement timing is incremented, and additional measurement timing is set for jth channel ch(j). Additional measurement timings as many as a value of c are set between regular measurement timings. Then, the process proceeds to step S117.

When there is no diagnostic parameter exceeding threshold value Rth1 (NO in S114), processing in steps S115 and S116 is skipped and the process proceeds to step S117.

In step S117, whether or not there is a next channel ch(j+1) is determined. When there is a next channel ch(j+1), the process proceeds to step S118 where j is incremented, and processing in step S113 or later is again performed.

For example, when there is no diagnostic parameter exceeding threshold value Rth1 in a sensor ch(1) but there is one in a sensor ch(2), only regular measurement is conducted in sensor ch(1), whereas measurement in sensor ch(2) is conducted not only regularly but also separately a certain time after that (before start of next regular measurement).

As described above, when an abnormality diagnosis system shown in the second embodiment senses occurrence or development of damage at a certain site, it makes the number of times of measurement for that site larger than the number of times for a normal site. Thus, the number of times of measurement is reduced to suppress an amount of data during a normal operation, which contributes to reduction in capacity of a storage. On the other hand, when necessary, the number of times of measurement is increased and detailed analysis can be conducted.

Preferably, in the second embodiment, data processor 80 increases a frequency of measurement by acceleration sensor 71 when magnitude of the diagnostic parameter exceeds threshold value Rth1.

More preferably, the acceleration sensor (71 to 73) includes a plurality of acceleration sensor elements 71 to 73. Data processor 80 calculates a diagnostic parameter for each piece of data measured in each piece of data measured by each of the plurality of acceleration sensor elements 71 to 73. Data processor 80 increases the frequency of measurement by an acceleration sensor element in which magnitude of a corresponding diagnostic parameter exceeds threshold value Rth1 among the plurality of acceleration sensor elements 71 to 73, and does not change the frequency of measurement by an acceleration sensor element in which magnitude of a corresponding diagnostic parameter does not exceed threshold value Rth1 among the plurality of acceleration sensor elements 71 to 73.

Thus, in the second embodiment, the number of times of measurement is made larger only for a site where damage is suspected than for the normal site, so that the site to which attention should be paid can be subjected to intensive measurement. A sign of development of damage is thus more readily grasped, and information effective for determination as to output suppression can be obtained.

Modification of Second Embodiment

The flowchart in FIG. 10 in the second embodiment includes single threshold value Rth1 as to whether or not to set additional measurement timing. A modification of the second embodiment shows an example in which a plurality of threshold values as to whether or not to set additional measurement timing are provided. In that case, the number of additional measurement timings is increased in accordance with the number of threshold values that are exceeded.

Figure 11:
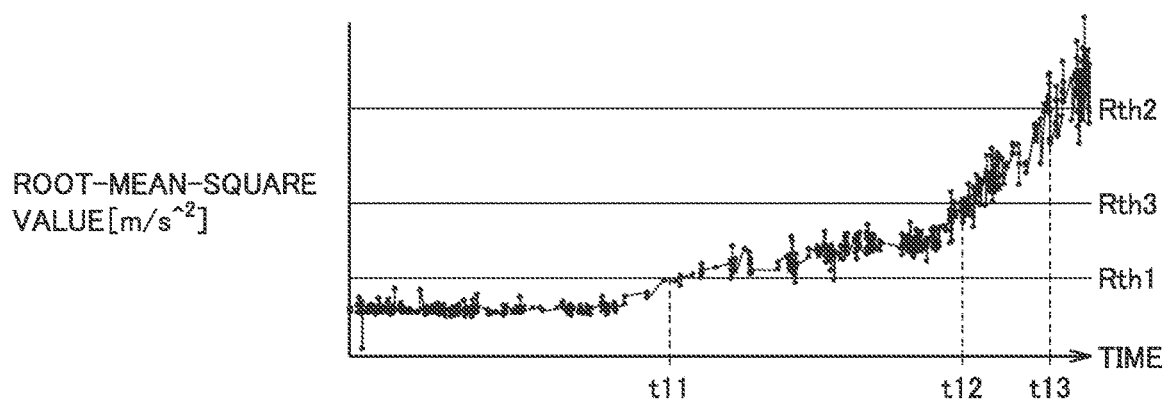
FIG. 11 is a diagram for illustrating a threshold value in setting additional measurement timing.

FIG. 11 is a diagram for illustrating a threshold value in setting additional measurement timing. FIG. 11 illustrates an example in which two threshold values as to whether or not to set additional measurement timing are provided. For example, as shown in FIG. 11, a threshold value Rth3 is provided between threshold value Rth1 for detection of initial damage and threshold value Rth2 for detection of use limit. With progress of damage as shown in FIG. 11, the root-mean-square value detected by the acceleration sensor exceeds threshold value Rth1 at time t11, exceeds threshold value Rth3 at time t12, and further exceeds threshold value Rth2 at time t13. Two threshold values of threshold value Rth1 and threshold value Rth3 as to whether or not to set additional measurement timing are provided in the example in FIG. 11. The number of additional measurement timings is set to one when threshold value Rth1 is exceeded and set to two when threshold value Rth3 is exceeded. The number of threshold values may further be increased, and the number of additional measurement timings may also further be increased.

Though one of threshold values for determination as to setting of additional measurement timing in FIG. 11 is identical to initial damage detection threshold value Rth1 in FIG. 3, the threshold value for determination as to setting of additional measurement timing may be set separately from initial damage detection threshold value Rth1.

Figure 12:
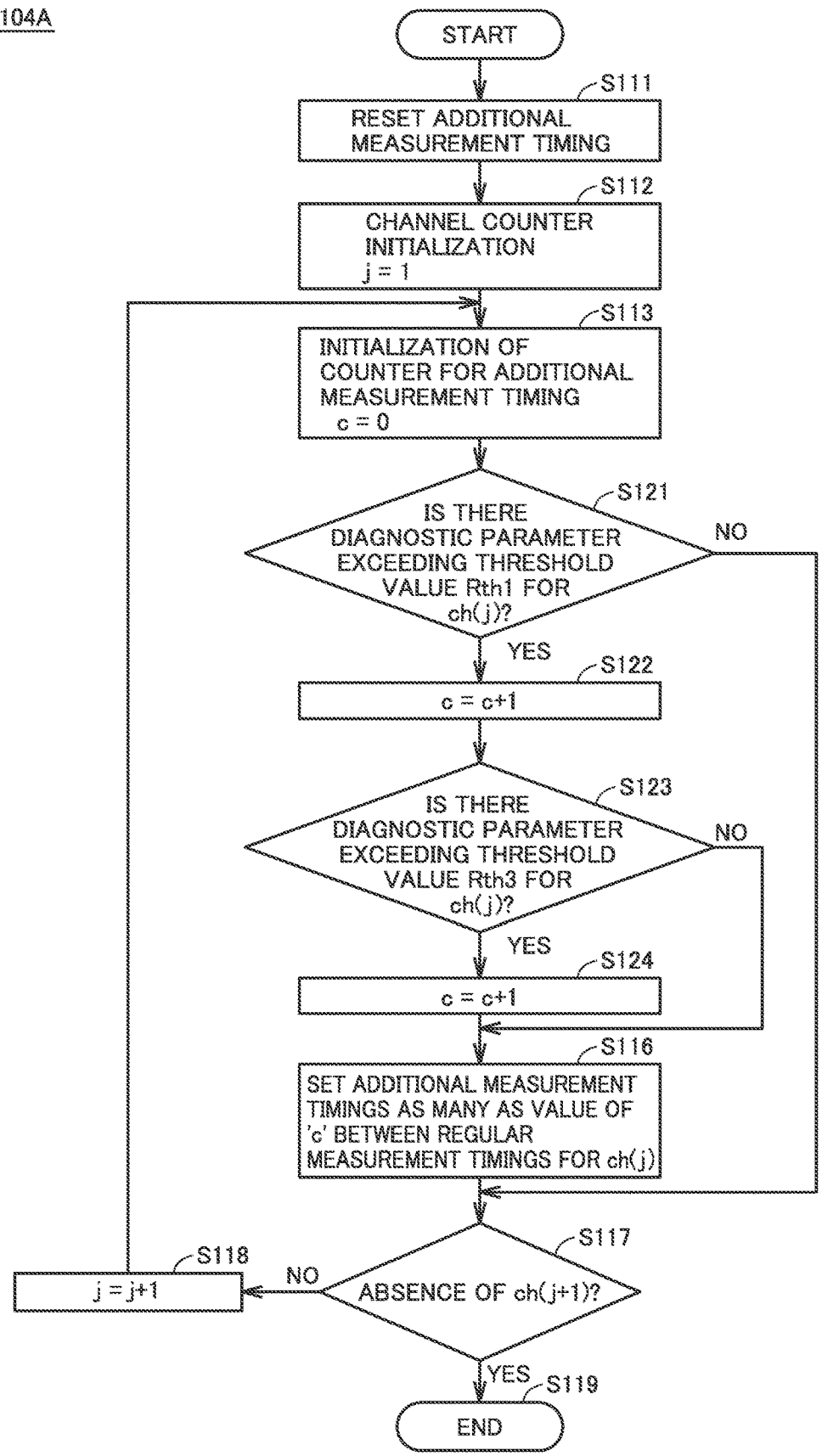
FIG. 12 is a flowchart for illustrating processing for setting additional measurement timing performed in a modification of the second embodiment.

FIG. 12 is a flowchart for illustrating processing for setting additional measurement timing performed in the modification of the second embodiment. In the modification of the second embodiment, processing in step S104A shown in FIG. 12 is performed instead of step S104 described with reference to FIG. 10.

Initially, in step S111, data processor 80 resets additional measurement timing for all measurement channels. Then, in step S112, channel counter j is initialized. Consequently, j=1 is set. In step S113, counter c for additional measurement timing is initialized. Consequently, c=0 is set.

In following step S121, data processor 80 determines whether or not there is a diagnostic parameter exceeding threshold value Rth1 for jth measurement channel ch(j). When there is a diagnostic parameter exceeding threshold value Rth1 (YES in S121), in step S122, counter c for additional measurement timing is incremented.

In step S123, data processor 80 determines whether or not there is a diagnostic parameter exceeding threshold value Rth3 for jth measurement channel ch(j). When there is a diagnostic parameter exceeding threshold value Rth3 (YES in S123), in step S124, counter c for additional measurement timing is incremented again, and the process proceeds to step S116. When there is no diagnostic parameter exceeding threshold value Rth3 (NO in S123), the processing in step S124 is skipped and the process proceeds to step S116.

In step S116, additional measurement timing is set for jth channel ch(j). Additional measurement timings as many as the value of c are set between regular measurement timings. Specifically, when threshold value Rth3 is exceeded, two additional measurement timings are set because the value of c is c=2, and when threshold value Rth1 is exceeded but threshold value Rth3 is not exceeded, one additional measurement timing is set because the value of c is c=1. Then, the process proceeds to step S117.

When there is no diagnostic parameter exceeding threshold value Rth1 (NO in S121), the processing in steps S122 to S124 and S116 is skipped and the process proceeds to step S117.

In step S117, whether or not there is a next channel ch(j+1) is determined. When there is a next channel ch(j+1), the process proceeds to step S118 where j is incremented, and processing in step S113 or later is again performed.

Figure 13:
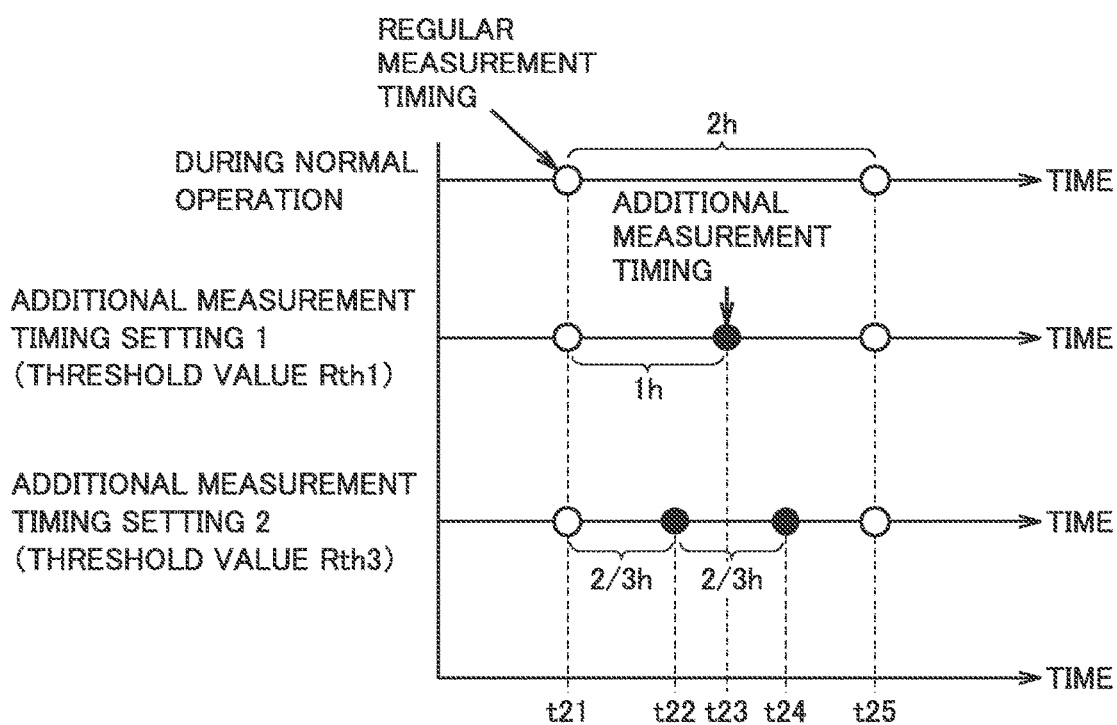
FIG. 13 is a diagram for illustrating an example of how additional measurement timing is set.

FIG. 13 is a diagram for illustrating an example of how additional measurement timing is set. As shown in FIG. 13, during a normal operation where no damage is observed, only regular measurement timing is set. The regular measurement timing is set at time t21 and time t25, and is set every two hours.

When an observation value exceeds threshold value Rth1 but does not exceed threshold value Rth3, the value of c is c=1 in FIG. 12 and hence one additional measurement timing is set between regular measurement timings. In the example in FIG. 13, additional measurement timing is set at time t23. In this case, measurement is conducted at one-hour interval.

When the observation value exceeds threshold value Rth3, the value of c is c=2 in FIG. 12 and hence two additional measurement timings are set between regular measurement timings. In the example in FIG. 13, additional measurement timing is set at time t22 and t24. In this case, measurement is conducted at 2/3-hour interval.

In the second embodiment, as a result of processing shown in FIG. 10, in the normal operation shown in FIG. 13, any additional timing setting 1 is made for each measurement channel. In the modification of the second embodiment, as a result of processing shown in FIG. 12, in the normal operation as above, any of additional timing setting 1 and additional timing setting 2 is made for each measurement channel.

In the modification of the second embodiment, a frequency of increase in number of times of measurement can be determined for each site depending on a degree of suspected damage, and a site to which attention should be paid can be subjected to further intensive measurement. A sign of development of damage is thus more readily grasped, and information effective for determination as to output suppression can be obtained.

Third Embodiment

In the second embodiment and the modification of the second embodiment, monitoring is carried out at additional measurement timing, whereas additional measurement timing is not used for determination as to output suppression. In a third embodiment, determination as to output suppression is made also at additional measurement timing so as to reliably protect the generator.

Figure 14:
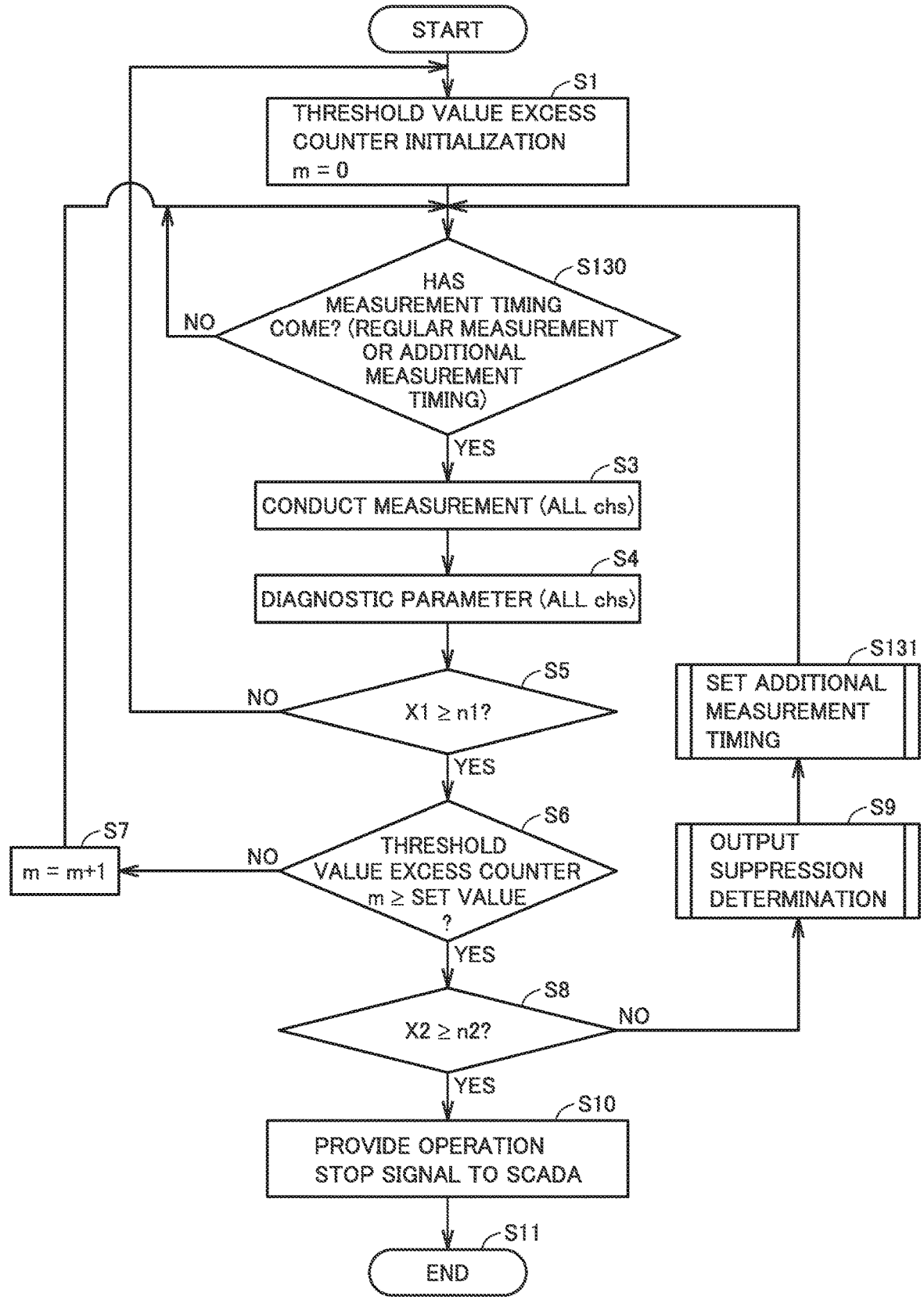
FIG. 14 is a flowchart for illustrating processing performed immediately after activation of the condition monitoring system in a third embodiment.

FIG. 14 is a flowchart for illustrating processing performed immediately after activation of the condition monitoring system in the third embodiment. In the flowchart in FIG. 14, processing in step S130 is performed instead of step S2 in the process in the flowchart in FIG. 4 and processing in step S131 is further added.

In step S131, additional measurement timing is set. In step S130, both of regular measurement timing and additional measurement timing are detected, and measurement and diagnosis in steps S3 and S4 are conducted in all measurement channels.

Since other processing having the same step number allotted is described with reference to FIG. 4, description will not be repeated.

Figure 15:
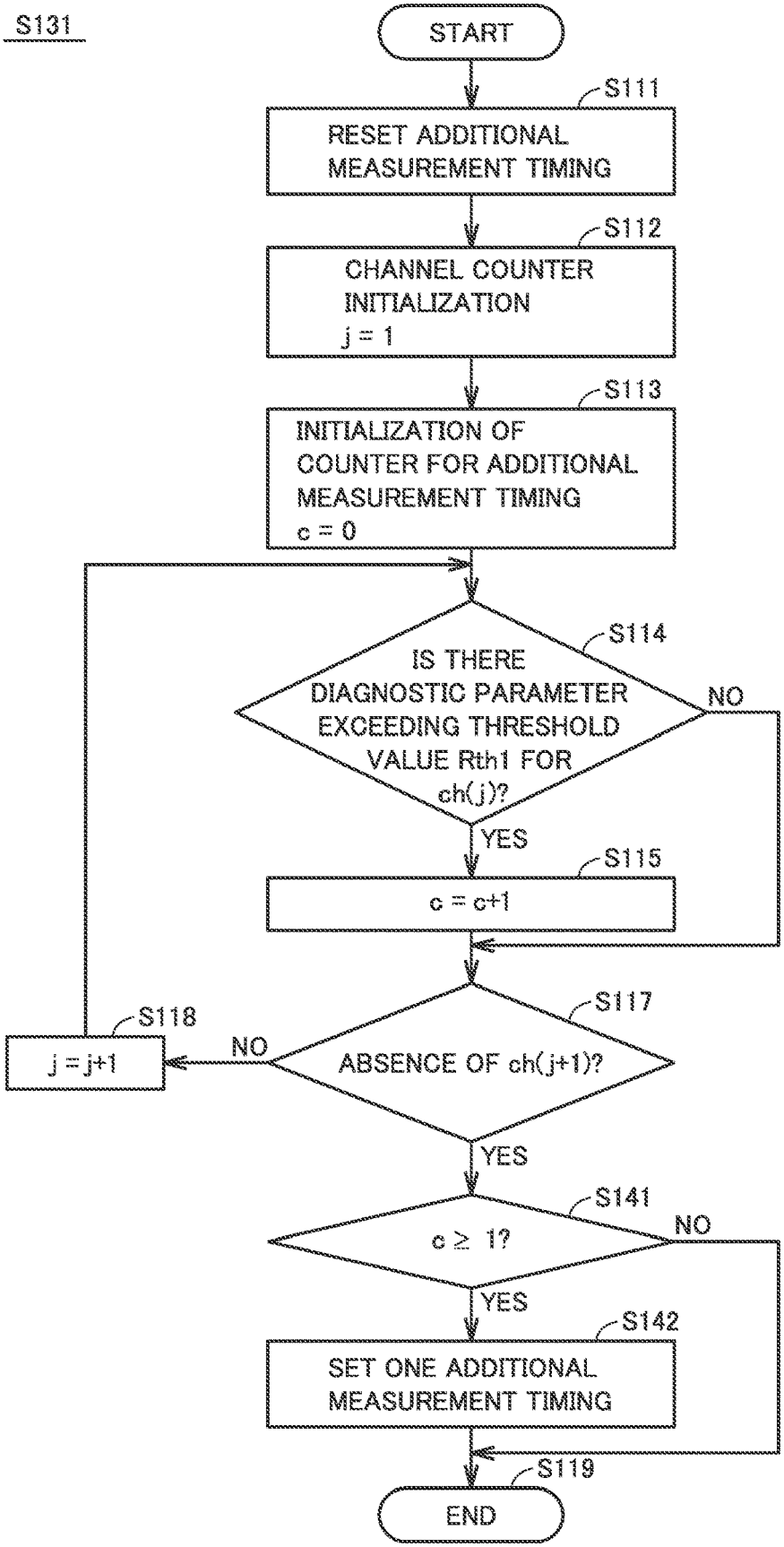
FIG. 15 is a flowchart for illustrating processing for setting additional measurement timing performed in step S131 in FIG. 14.

When there is a diagnostic parameter exceeding a threshold value in any measurement channel, additional measurement timing is set in common among all measurement channels. FIG. 15 is a flowchart for illustrating processing for setting additional measurement timing performed in step S131 in FIG. 14.

In the flowchart in FIG. 15, a step following step S118 in which channel number j is incremented by one in the process in the flowchart in FIG. 10 is changed to step S114. Since counter c is not initialized for each channel, counter c for additional measurement timing is incremented for all channels. Additional measurement timing is set for each channel in step S116, whereas it is set in common among all channels in steps S141 and S142.

Specifically, when there is a diagnostic parameter exceeding threshold value Rth1 in at least one of measurement channels as a result of repeated processing in steps S114, S115, S117, and S118 in FIG. 15, relation of c≥1 is satisfied, and one additional measurement timing is set in step S142.

In contrast, relation of c=0 is satisfied only when there is a diagnostic parameter exceeding threshold value Rth1 in none of measurement channels, and hence additional measurement timing is not set in step S142.

Modification of Third Embodiment

In the flowchart in FIG. 15 in the third embodiment, there is single threshold value Rth1 as to whether or not to set additional measurement timing. A modification of the third embodiment shows an example in which a plurality of threshold values as to setting of additional measurement timing are provided, similarly to the modification of the second embodiment. In that case, the number of additional measurement timings is increased in accordance with the number of threshold values that are exceeded. An example where a plurality of threshold values are provided is the same as in FIG. 11.

FIG. 16 is a flowchart for illustrating processing for setting additional measurement timing performed in the modification of the third embodiment. In the modification of the third embodiment, processing in step S131A shown in FIG. 16 is performed instead of step S131 described with reference to FIG. 15.

In the flowchart in FIG. 16, a step following step S118 in which channel number j is incremented by one in the process in the flowchart in FIG. 12 is changed to step S121. Since counter c is not initialized for each channel, counter c for additional measurement timing is incremented for all channels. Additional measurement timing is set for each channel in step S116, whereas it is set in common among all channels in steps S151 to S154.

Specifically, as a result of repeated processing in steps S121 to S124, S117, and S118 in FIG. 16, a value of counter c is added up in accordance with the number of measurement channels where there is a diagnostic parameter exceeding threshold value Rth1. Then, when c is equal to or larger than 2 after reflection of all measurement channels on counter c (YES in S151), in step S152, two additional measurement timings are set. When the value of c is 1 (NO in S151 and YES in S153), in step S154, one additional measurement timing is set. When the value of c is 0 (NO in S151 and NO in S153), no additional measurement timing is set. At the additional measurement timing set in the third embodiment, output suppression determination shown in FIGS. 5 and 6 is made as is made at the regular measurement timing.

As described above, in an abnormality diagnosis system in the third embodiment, the acceleration sensor includes the plurality of acceleration sensor elements 71 to 73. Data processor 80 calculates a diagnostic parameter for each piece of data measured by each of the plurality of acceleration sensor elements 71 to 73. When there is an acceleration sensor element in which magnitude of a corresponding diagnostic parameter exceeds the threshold value among the plurality of acceleration sensor elements, the data processor increases the frequency of measurement for all of the plurality of acceleration sensor elements 71 to 73.

When damage is suspected, the number of times of measurement can thus be made larger than in the normal operation. In this case, determination as to whether or not to suppress output is made more often than in the normal operation, and even a damaged wind turbine generator can carefully be operated.

It should be understood that the embodiments disclosed herein are illustrative and non-restrictive in every respect. The scope of the present invention is defined by the terms of the claims rather than the description of the embodiments above and is intended to include any modifications within the scope and meaning equivalent to the terms of the claims.

REFERENCE SIGNS LIST 10 wind turbine generator; 20 main shaft; 30 blade; 40 gearbox; 50 generator; 52 control board; 54 electric power transmission line; 60 bearing; 71 to 73 acceleration sensor; 74 proximity sensor; 75 current sensor; 80 data processor; 81 to 85 filter; 90 nacelle; 91 to 95 A/D converter; 100 tower; 200 computing unit; 201 memory; 202 monitoring terminal; 300 power generation controller; 500 condition monitoring system

The invention claimed is:

1. A condition monitoring system that monitors a condition of a wind turbine generator, the condition monitoring system comprising:
   a monitoring terminal;
   an acceleration sensor; and
   a data processor, wherein
   the data processor configured to communicate with a power generation controller of the wind turbine generator,
   the data processor is configured to calculate a diagnostic parameter from data measured by the acceleration sensor, determine a degree of damage to a bearing or a gear included in the wind turbine generator based on the diagnostic parameter, and output information indicating a degree of suppression of electric power generated by the wind turbine generator in accordance with the degree of damage to the bearing or the gear,
   the data processor is configured to output a suppression signal to the power generation controller to suppress a degree of progress of damage to the bearing or gear based on the information indicating the degree of suppression,
   the data processor increases a frequency of measurement by the acceleration sensor when magnitude of the diagnostic parameter exceeds a threshold value,
   the acceleration sensor includes a plurality of acceleration sensor elements,
   the data processor calculates the diagnostic parameter for each piece of data measured by each of the plurality of acceleration sensor elements, and
   when there is an acceleration sensor element in which magnitude of a corresponding diagnostic parameter exceeds the threshold value among the plurality of acceleration sensor elements, the data processor increases the frequency of measurement by the plurality of acceleration sensor elements.

2. The condition monitoring system according to claim 1, wherein
   the data processor includes a memory,
   the data processor causes the memory to store the number of times of excess of magnitude of the diagnostic parameter over a first threshold value,
   the data processor does not allow the monitoring terminal to show the information until the number of times reaches a predetermined first number, and when the number of times is equal to or larger than the predetermined first number, the data processor allows the monitoring terminal to show the information.

3. The condition monitoring system according to claim 2, wherein when the diagnostic parameter exceeds a second threshold value larger than the first threshold value, the data processor provides a signal indicating stop of operation of the wind turbine generator to the power generation controller.

4. The condition monitoring system according to claim 1, wherein the data processor determines a time period in calculating a rate of change over time in the diagnostic parameter based on a product of a rotation speed of a rotating element of the wind turbine generator and power generation output, and when the rate of change in diagnostic parameter in the time period is higher than the rate of change in diagnostic parameter in a previous time period, the data processor calculates the degree of suppression and controls the monitoring terminal to show the information on which the calculated degree of suppression is reflected.

5. The condition monitoring system according to claim 1, wherein the acceleration sensor includes a plurality of acceleration sensor elements, the data processor calculates the diagnostic parameter for each piece of data measured by each of the plurality of acceleration sensor elements, and the data processor increases the frequency of measurement by an acceleration sensor element in which magnitude of a corresponding diagnostic parameter exceeds the threshold value among the plurality of acceleration sensor elements, and does not change the frequency of measurement by an acceleration sensor element in which magnitude of a corresponding diagnostic parameter does not exceed the threshold value among the plurality of acceleration sensor elements.

* * * * *